United States Patent [19]

Yagi et al.

[11] Patent Number: 4,694,799
[45] Date of Patent: Sep. 22, 1987

[54] IGNITION TIMING CONTROL SYSTEM FOR INTERNAL COMBUSTION ENGINES

[75] Inventors: Shizuo Yagi, Asaka; Yoshiaki Hirosawa, Shiki; Makoto Kawai, Tokorozawa; Isao Fujii, Hasuda, all of Japan

[73] Assignee: Honda Giken Kogyo Kabushiki Kaisha, Tokyo, Japan

[21] Appl. No.: 787,750

[22] Filed: Oct. 15, 1985

[30] Foreign Application Priority Data

Oct. 16, 1984 [JP] Japan .................. 59-215204

[51] Int. Cl.⁴ .................. F02P 5/14; F02P 41/22
[52] U.S. Cl. .................. 123/425; 123/435; 123/179 BG
[58] Field of Search ............ 123/418, 416, 424, 425, 123/435, 179 BG

[56] References Cited

U.S. PATENT DOCUMENTS

| | | | |
|---|---|---|---|
| 4,399,802 | 8/1983 | Oshiage et al. | 123/425 |
| 4,422,421 | 12/1983 | Ezoe | 123/179 BG |
| 4,481,925 | 11/1984 | Karau et al. | 123/425 |
| 4,586,474 | 5/1986 | Akasu | 123/425 |
| 4,596,218 | 6/1986 | Karau et al. | 123/425 |
| 4,598,680 | 7/1986 | Lanfer | 123/425 |

Primary Examiner—Willis R. Wolfe, Jr.
Attorney, Agent, or Firm—Lyon & Lyon

[57] ABSTRACT

An ignition timing control system for an internal combustion engine includes a crank angle detector for producing a first pulse signal indicative of a reference crank angle position of the crankshaft and a second pulse signal indicative of a crank angle position that changes constantly with rotation of the crankshaft, an ideal crank angle detector for producing an output signal based on the first and second pulse signals and indicative of an ideal crank angle position at which pressure internal of the engine cylinder attains a peak value, pressure sensing means for producing an output signal indicative of the peak pressure value, a phase difference detector for producing an output signal indicative of the phase difference between the ideal crank angle position signal and the peak pressure value signal, first ignition timing control means for producing an output signal indicative of optimum ignition timing which is in accordance with the phase difference output signal, and second ignition timing control means for controlling ignition timing to a fixed value during actuation of the engine starter.

5 Claims, 14 Drawing Figures

IGNITION TIMING CONTROL SYSTEM FOR INTERNAL COMBUSTION ENGINES

BACKGROUND OF THE INVENTION

This invention relates to an ignition timing control system for an internal combustion engine for controlling the ignition timing of the engine at engine start.

Ideally, a spark ignition-type engine should operate at optimum ignition timing under all running conditions to fully combust the fuel mixture and develop maximum output power at all times. Experiments have shown that the ideal crank angle position at which cylinder internal pressure peaks for maximum engine power is about 12 degrees after top dead center. Accordingly, the conventional practice is to set ignition timing so that the position of the indicated pressure peak assumes the ideal crank angle position. However, the engine will not always develop maximum power because the actual position of the indicated pressure peak is not necessarily brought to the ideal crank angle position every cycle owing to a fluctuating ignition delay between an ignition operation and the actual ignition of the mixture. An attempt to improve upon the foregoing is a method of controlling ignition timing in dependence on a phase difference between an electrically detected position of the peak value of cylinder internal pressure and an electrically detected predetermined angular position of the engine output shaft. Though the method is an effective one, applying it at engine start-up time causes unstable engine rotation and difficulty in achieving a reliable start. The reason is that when the engine is started by a starting motor, a motoring waveform is superposed on the indicated pressure waveform, so that the true position of the indicated pressure peak is difficult to recognize. This can cause the position of a motoring waveform peak to be mistakenly recognized as the position of the indicated pressure peak, with the result that the ignition timing is so controlled as to assume an improper value.

SUMMARY OF THE INVENTION

It is therefore an object of the present invention to provide an ignition timing control system for an internal combustion engine, that enables the engine to be started in a reliable manner.

According to the present invention, the foregoing object is attained by providing an ignition timing control system for an internal combustion engine, comprising a crank angle detector for producing a first pulse signal indicative of a reference crank angle position of a crankshaft of the engine and a second pulse signal indicative of a crank angle position that changes constantly with rotation of the crankshaft; an ideal crank angle detector receiving the first and second pulse signals from the crank angle detector for producing an output signal indicative of an ideal crank angle position at which pressure internal of a cylinder of the engine attains a peak value; pressure sensing means for sensing the peak value of pressure internal of the cylinder and producing an output signal indicative of the sensed peak value of pressure; a phase difference detector receiving the output signals from the ideal crank angle detector and from the pressure sensing means for detecting a phase difference between the output signals and for producing an output signal indicative of the detected phase difference; first ignition timing control means receiving the output signal from the detected phase difference detector for producing an output signal indicative of optimum ignition timing which is in accordance with the detected phase difference; and second ignition timing control means receiving the first and second pulse signals from the crank angle detector and an input signal from a starter of the engine for controlling ignition timing to a fixed value for a period of time during which the input signal indicates actuation of the starter.

During actuation of the starter at initial starting of the engine, feedback control of ignition timing in accordance with the phase difference between the signal indicative of the peak value of pressure and the signal indicative of the crank angle position is suspended and ignition timing is maintained at the fixed value by the second ignition timing control means. This prevents ignition timing from being regulated to an improper value due to the influence of the motoring waveform, namely as the result of erroneous recognition of the peak pressure value position caused by superposition of the motoring waveform on the indicated pressure waveform at initial starting of the engine. Accordingly, the engine can be started in a very stable manner.

The above and other objects, features and advantages of the invention will be more apparent from the ensuing detailed description taken in connection with the accompanying drawings.

DETAILED DESCRIPTION

Figure 2:
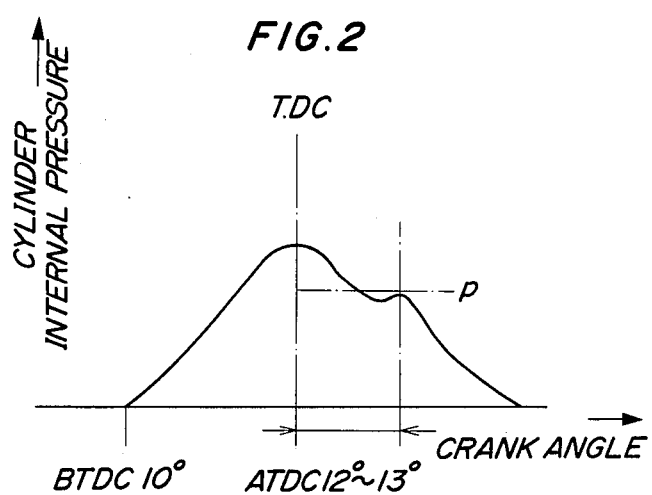
FIG. 2 is a graph showing an indicated pressure waveform, upon which a motoring waveform has been superposed, at the starting of an engine.
Figure 3:
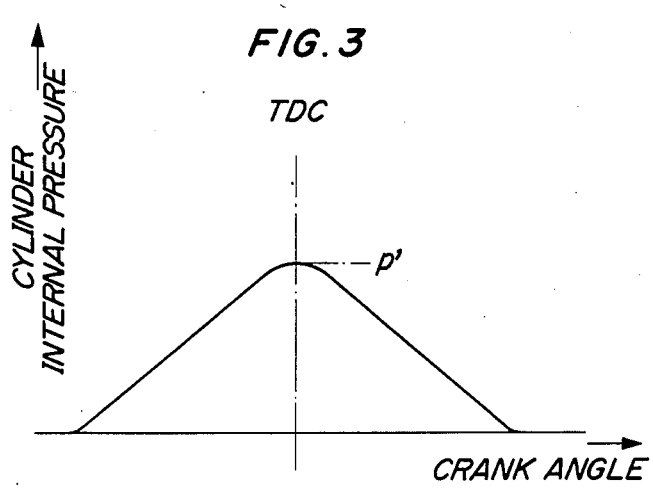
FIG. 3 is a graph showing a motoring waveform.

Before turning to a detailed description of an embodiment of the present invention, the problems encountered in the prior art will be discussed in greater detail with reference to FIGS. 1 through 3.

Figure 1:
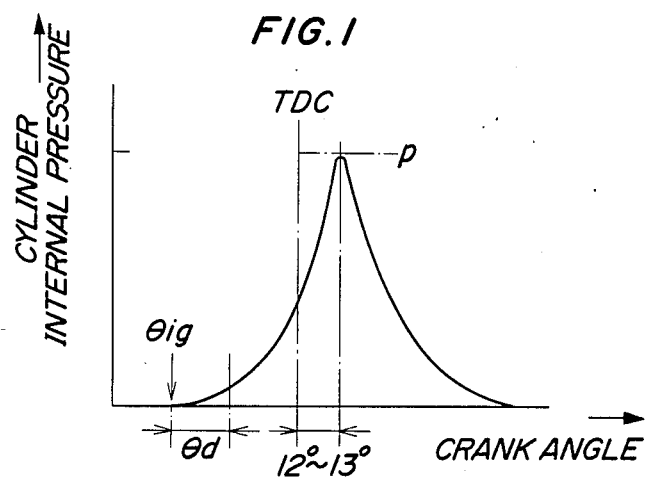
FIG. 1 is a graph showing the relationship between ignition timing and cylinder internal pressure.

FIG. 1 is a graph illustrating cylinder internal pressure, which is plotted along the vertical axis versus crank angle plotted along the horizontal axis, when a spark ignition-type internal combustion engine is operated at an optimum firing timing. If an ignition operation is performed at an ignition timing indicated by a crank angle $\theta ig$, the mixture will ignite following a certain ignition delay $\theta d$. After the mixture is ignited, cylinder internal pressure rises sharply, attains a pressure peak p and then falls. It is known that the crank angle position at the pressure peak is related to engine power, and it has been confirmed by experimentation that the crank angle position of a pressure peak at which maximum power is provided is 12° to 13° after top dead center (hereafter referred to as "ATDC"), as illustrated in FIG. 1. This crank angle position of 12° to 13° ATDC is referred to as the ideal crank angle position. Accordingly, the conventional ignition timing control system is adapted to set the ignition timing $\theta$ig in such a manner that the position of the indicated pressure (cylinder internal pressure) peak assumes the ideal crank angle position of 12° to 13° ATDC under certain operating conditions.

However, as mentioned above, the so-called ignition delay $\theta$d intervenes between the ignition operation and the point at which the mixture actually catches fire. The ignition delay $\theta$d is influenced by turbulence in the mixture flow, the air-fuel ratio of the mixture, and temperature and pressure of the mixture, and the turbulence developed by the mixture flow in turn varies depending upon factors such as the shape of the combustion chamber. Consequently, with the conventional ignition timing control system that does not take into account these factors in setting the ignition timing $\theta$ig in such a manner that the position of the indicated pressure peak attains the ideal crank angle position, the engine cannot always be made to exhibit maximum power because the actual position of the indicated pressure peak is not necessarily brought to the ideal crank angle position every cycle.

In an effort to solve the foregoing problem, there has been proposed an ignition timing control system of a spark ignition-type internal combustion engine, as disclosed in the specification of Japanese Patent Publication No. 49-29209, which comprises means for electrically detecting the timing at which the peak value of cylinder internal pressure occurs, means for electrically detecting a predetermined angular position of the engine output shaft, a comparator means for comparing a position at which the cylinder internal pressure attains the peak value and the predetermined angular position of the output shaft, and a delay means for adjusting the ignition timing in dependence upon the phase difference between the two positions. However, if this method of controlling ignition timing in accordance with the phase difference between the position of the peak value of cylinder internal pressure and the predetermined angular position of the engine output shaft is applied when the engine is started, the result is unstable engine rotation and difficulty in achieving reliable starting. Specifically, when an engine is started by a starting motor, a motoring waveform shown in FIG. 3 is superposed on the indicated pressure waveform, as shown in FIG. 2, thus making it difficult to distinguish the true position (p in FIG. 2) of the indicated pressure peak. Accordingly, if the position (p′ in FIG. 3, located at approximately top dead denter, or TDC) of the motoring waveform peak is mistakenly recognized as the position of the indicated pressure peak, then the ignition timing $\theta$ig is so controlled as to occur later than the correct value (e.g., 10° before TDC, hereafter referred to as "BTDC"). Thus, stable ignition timing control cannot be performed. In other words, with the proposed system described above, the ignition timing $\theta$ig is controlled in dependence upon the phase difference between the actual position of the peak value of indicated cylinder pressure and the predetermined angular position of the shaft in such a manner that the position of the indicated pressure peak assumes the ideal crank angle position (12°–13° ATDC). However, since the ignition timing control is so effected that the indicated pressure peak assumes the position 12° to 13° ATDC with respect to the motoring waveform peak position p′ (approximately the position of TDC), ignition timing is delayed to an improper value.

The present invention seeks to solve the foregoing problem and will now be described in connection with a preferred embodiment thereof with reference to FIGS. 4 through 8.

Figure 4:
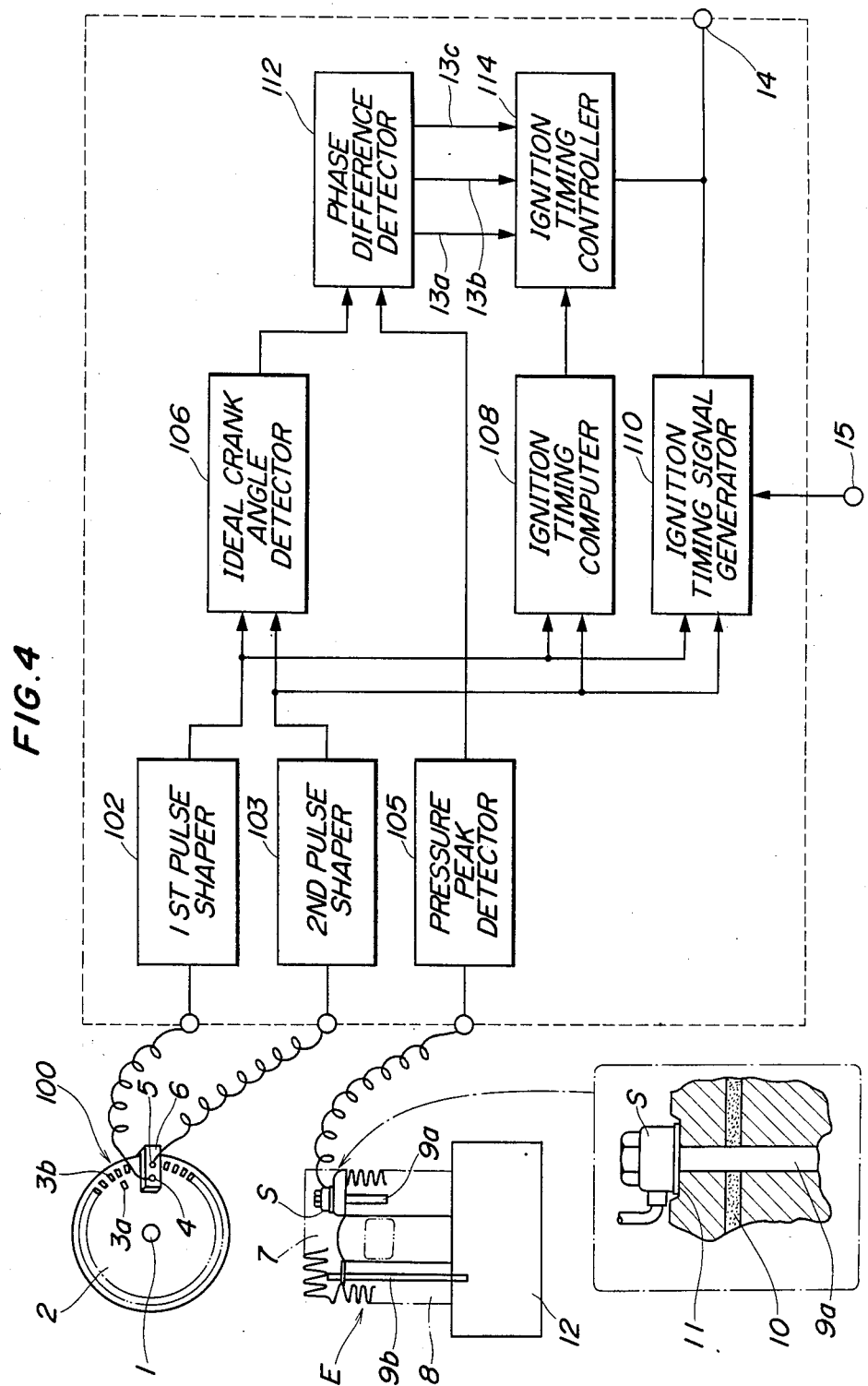
FIG. 4 is a block diagram illustrating a preferred embodiment of an ignition timing control system for an internal combustion engine according to the present invention.

Referring to FIG. 4, there is shown a preferred embodiment of an ignition timing control system according to the present invention. The system includes a crank angle detecting unit 100 for producing a first pulse signal indicative of a reference crank angle position of a crankshaft, of an internal combustion engine, not shown, and a second pulse signal indicative of a crank angle position that varies constantly with rotation of the crankshaft. In the illustrated embodiment, photo-detecting means is employed as the crank angle detecting unit 100 and comprises a disk 2 mounted on the crankshaft or, as shown, on a rotary shaft 1 that rotates in synchronism with the crankshaft, a first detector 4 attached to a mounting jig 6 for detecting the reference crank angle position, and a second detector 5 also attached to the jig 6 for detecting the constantly changing rotational angle of the crankshaft. The disk 2 has a peripheral portion provided with a single first slit 3a for detecting the reference crank angle position, and with a plurality of second slits 3b spaced circumferentially at intervals of 1°, the slits 3b being located further from the rotary shaft than the slit 3a. The first detector 4 and second detector 5 are arranged on the paths traversed by the first slit 3a and second slits 3b, respectively. The crank angle detecting unit 100 will be described later in greater detail with reference to FIG. 5.

The output of the first detector 4 is connected to a first pulse shaper 102 where the output is shaped before being applied to an ideal crank angle detector 106, an ignition timing computing circuit 108, and an ignition timing signal generating circuit 110 for producing an ignition timing signal at engine start, as will be described later. The output of the second detector 5 is connected to a second pulse shaper 103 before being fed into the detector 106, computing circuit 108 and signal generating circuit 110 at respective input terminals separate from those that receive the output of first pulse shaper 102. The ideal crank angle detector 106 comprises a counter adapted to start counting pulses of the second pulse signal from the second pulse shaper 103 at the arrival of the first pulse signal from the first pulse shaper 102 for producing a signal indicative of the ideal crank angle position, namely a pulse signal indicative of a crank angle position 12° ATDC. The output of the ideal crank angle detector 106 is applied to one input terminal of a phase difference detector 112.

An indicated pressure sensor S comprises a ring-shaped piezoelectric element secured to a portion of a cylinder head 7 of an engine E through a gasket 10 and seal 11 by tightening a stud bolt 9a, which also serves to attach the cylinder head 7 to a cylinder portion 8. Attaching the pressure sensor S in this manner enables it to sense a pressure variation inside the cylinder 8 as an electric signal. The output of the pressure sensor S is applied to an indicated pressure peak detector 105. The detector 105 is provided with a threshold potential of a prescribed level, with which the output of the pressure sensor S is compared, and is adapted to detect the peak pressure point internal of the cylinder by detecting the peak of the sensor output signal, which exceeds the applied threshold level. Thus, the pressure sensor S and the indicated pressure peak detector 105 construct indicated pressure sensing means for sensing the peak pressure point of the pressure inside the engine cylinder. The output of the detector 105 is applied to the other input terminal of the phase difference detector 112.

The phase difference detector 112 detects the phase difference between the ideal crank angle signal received from the ideal crank angle detector 106 and the peak pressure point signal received from the indicated pressure peak detector 105. The detector 112 has a + phase difference signal line 13a on which an output is delivered for a positive phase difference, a phase difference signal line 13b on which an output is delivered for an in-phase condition, and a − phase difference signal line 13c on which an output is delivered for a negative phase difference, each line being connected to a respective input terminal of an ignition timing control circuit 114.

The ignition timing computing circuit 108, which receives the outputs of the first and second pulse shapers 102, 103 at separate input terminals, as mentioned above, has its output connected to a respective input terminal of the ignition timing control circuit 114. The ignition timing computing circuit 108 calculates the rotational speed of the engine based on the first and second pulse signals generated due to rotation of the rotary shaft 1, i.e., the crankshaft, and determines an ignition timing which corresponds to the rotational speed. To this end, the ignition timing computing circuit 108 possesses a function analogous to a well-known automatic spark advance device of the type that regulates ignition timing in dependence upon engine speed. The ignition timing control circuit 114, which receives the ignition timing regulated by the ignition timing calculating circuit 108 in dependence upon the engine rotational speed, corrects the ignition timing by a phase difference element obtained from the phase difference detector 112 to produce an output signal indicative of optimum ignition timing. The output of the ignition timing control circuit 114 is connected to an ignition timing signal output terminal 14, which is connected to an igniter, not shown.

In accordance with the present invention, the signal generating circuit 110, which is adapted to generate an ignition timing signal at engine start, receives the first and second pulse signals from the first and second pulse shapers 102, 103, and additionally receives an input from an input terminal 15 to which it is connected. The signal applied to the input terminal 15 indicates operation of a switch, such a starting switch. The output of circuit 110 is connected to the output terminal 14.

Figure 7:
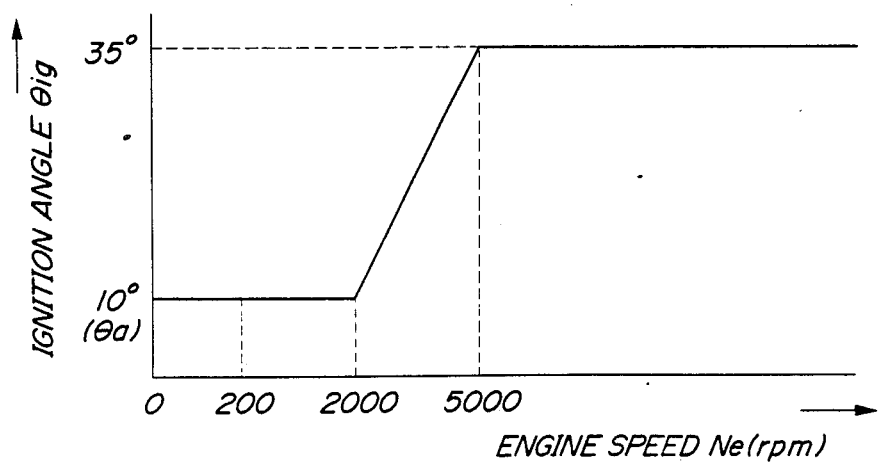
FIG. 7 is a view showing an example of an ignition timing characteristic of the ignition timing control system of the present invention, with engine rpm being plotted against ignition angle.

The ignition timing signal generating circuit 110 is provided for generating the initial ignition timing signal at starting of the engine. FIG. 7 illustrates an example of an ignition timing characteristic of the ignition timing control system of the present invention, with engine rpm Nc being plotted against ignition angle $\theta$ig. The characteristic of FIG. 7 is applicable to a four-cycle engine and preferably is set to follow an MBT (minimum advance for best torque) curve. As illustrated in FIG. 7, the ignition angle $\theta$ig is set to a predetermined angle $\theta$a (e.g., 10° BTDC) near the TDC of the engine cylinder by the ignition timing signal generating circuit 110 when the engine speed is less than a predetermined low engine speed Na (200-300 rpm), namely less than the maximum engine speed (200-300 rpm) obtained when the engine is started by activating the starting motor.

Figure 5:
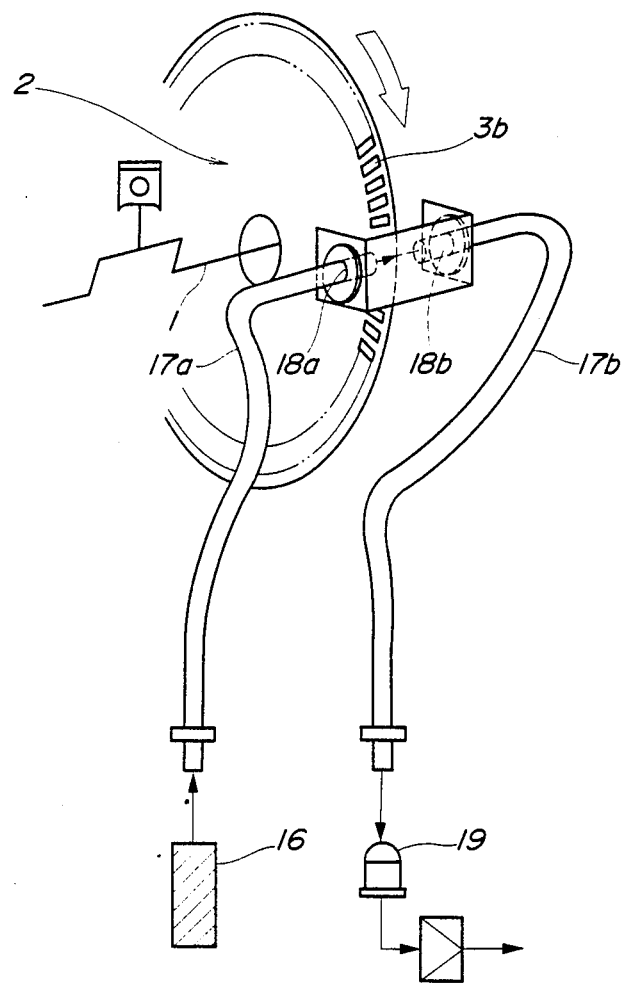
FIG. 5 is a connection diagram showing the details of a crank angle detector in the embodiment of FIG. 1.

The details of the crank angle detecting unit 100 will now be described with reference to FIG. 5. The rotary shaft 1 is operatively associated with the crankshaft so as to rotate in synchronism therewith. A laser light source 16 internally accommodates an He-Ne or semiconductor laser for applying a laser beam to one end of an optical fiber 17a. The light beam emerges from the other end of optical fiber 17a, which end is provided with a SELFOC lens 18a. The emergent laser beam passes through the slits 3b in disk 2 as the disk rotates and enters one end of an optical fiber 17b, this end being provided with a SELFOC lens 18b. The laser beam propagates along the optical fiber 17b, exiting from the other end thereof to impinge upon a PIN photodiode 19. The laser beam incident upon the photodiode 19 is converted thereby into an electrical pulse, namely the first pulse signal, which the photodiode 19 applies to the first pulse shaper 102. In the foregoing, the SELFOC lenses 18a, 18b form the first detector 4, shown in FIG. 5. Though the details of the second detector 5 are not shown in FIG. 5, the construction is similar to that of the first detector 4.

Figure 6:
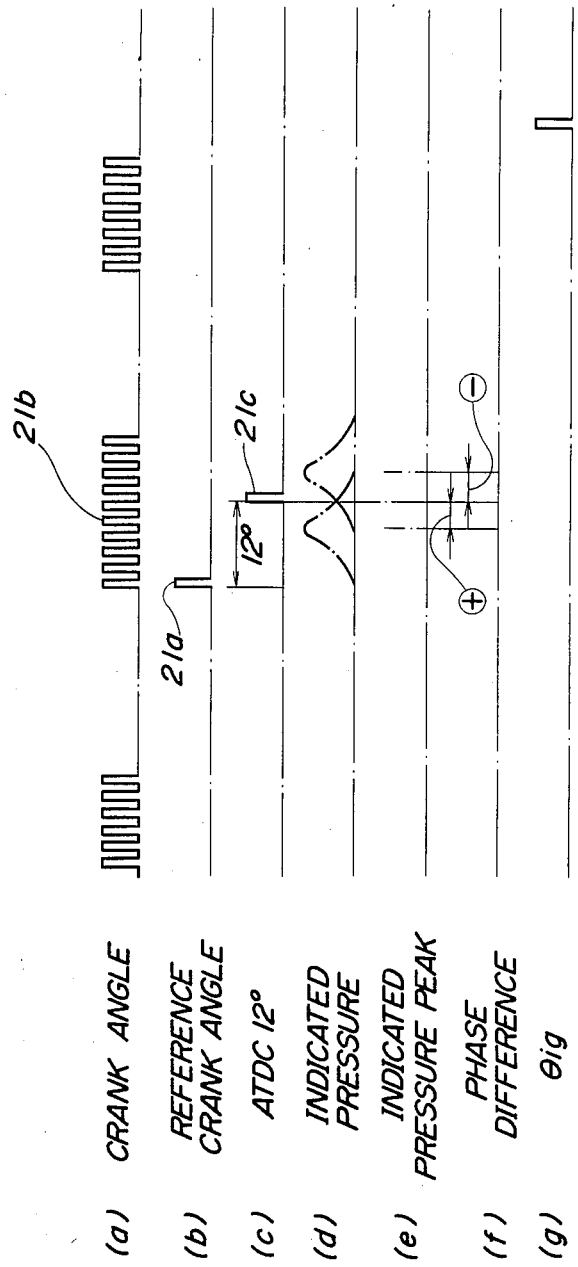
FIGS. 6a–g show a timing chart of various signals and is useful in describing the operation of the embodiment of the present invention.
Figure 8:
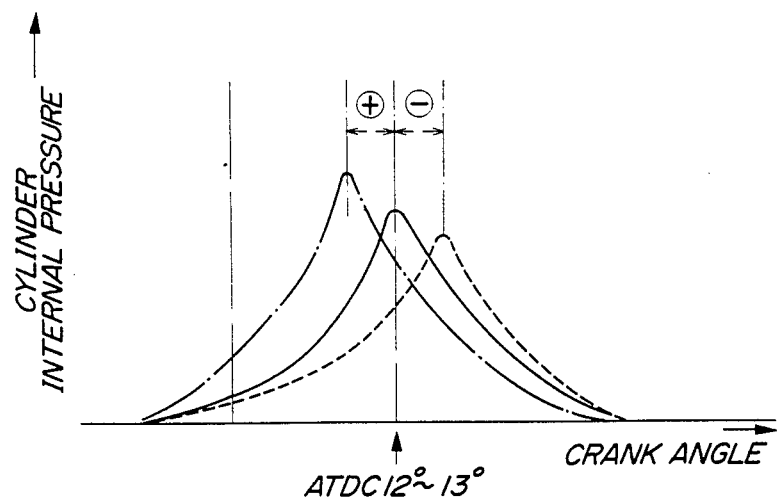
FIG. 8 is a view showing a cylinder internal pressure characteristic and is useful in describing the operation of an ignition timing control circuit included in the system of FIG. 4.

Reference is now made to FIGS. 6(a) through (g) and to FIG. 8 for a discussion of the operation of the present invention. To facilitate the description, let it be assumed that the reference crank angle position, namely the position where the first pulse signal, indicated at numeral 21a in FIG. 6(b), is generated, is located at the TDC position. The reference crank angle position can be made to coincide with the TDC position merely by setting the mounting jig 6 of the crank angle detecting unit 100 at the proper position on the circumference of the disk 2. When the starting switch is closed, the crankshaft begins rotating and, hence, so does the disk 2 mounted thereon. Rotation of the disk 2 causes the crank angle detecting unit 100 to produce the first pulse signal 21a and the second pulses, which are shown at 21b in FIG. 6. The first and second pulse signals 21a, 21b are respectively shaped by the first and second pulse shapers 102, 103 before being fed into the ideal crank angle detector 106, ignition timing computing circuit 108 and ignition timing signal generating circuit 110. When the engine speed at the end of the starting operation rises above a predetermined value (e.g., 200 rpm), the ideal crank angle detector 106 begins counting the second pulses 21b at the instant the first pulse 21a arrives. When 12 of the second pulses 21b are counted, the ideal crank angle detector 106 applies a pulse signal 21c, which is indicative of a position 12° ATDC, to one input terminal of the phase difference detector 112. The signal 21c, shown in FIG. 6(b), thus indicates the ideal crank angle position. Meanwhile, the ignition timing computing circuit 108 computes engine speed from the first and second pulse signals 21a, 21b, computes the ignition timing $\theta$ig corresponding to the computed engine speed, and sends a signal indicative of the computed ignition timing to the ignition timing control circuit 114. At the beginning of the starting operation, however, the ignition timing control circuit 114 is not operative and does not produce an output. Initially, only the ignition timing signal generating circuit 110 is set into operation by the signal indicative of starting switch closure that arrives from the input terminal 15, with the circuit 110 remaining operative during the application of this signal. In other words, the ignition timing signal generating circuit 110 generates a signal indicative of a predetermined, fixed ignition timing $\theta$ig (e.g., 10° BTDC in FIG. 2) at engine start during the application of the signal indicating that the starting switch has been operated, namely while the engine speed is rising from zero to approximately 200 rpm. The fixed ignition timing signal is coupled from the output terminal 14 to the igniter, and the mixture is ignited the first time after the ignition delay $\theta$d.

Owing to rotation of the crankshaft and ignition of the mixture, pressure inside the cylinder rises abruptly. The indicated pressure of the cylinder, which is shown in FIG. 6(d), is sensed by the indicated pressure sensor S, and the indicated pressure peak, shown in FIG. 6(e), is detected by the indicated pressure peak detector 105. The output of detector 105, which is indicative of the indicated pressure peak, is applied to the other input terminal of the phase difference detector 112. When the ideal crank angle position signal and indicated pressure peak signal are applied to its two input terminals, the phase difference detector 112 detects the phase difference [FIG. 6(f)] between these two signals and delivers a signal indicative of the phase difference to the ignition timing control circuit 114 on one of the phase difference signal lines 13a, 13b, 13c, depending upon the phase difference detected. The ignition timing control circuit 114 then produces an optimum ignition timing signal [FIG. 6(g)] by correcting, based on the phase difference signal from the phase difference detector 112, the ignition timing $\theta$ig corresponding to the engine rotational speed received from the ignition timing computing circuit 108. Thus, as shown in FIG. 8, the ignition timing is corrected by being retarded when the phase difference is positive and advanced when the phase difference is negative so that the indicated voltage peak is always made to coincide with the ideal crank angle position (12-13° ATDC). The next cycle ignition timing is thus corrected to the optimum ignition timing. Thus, even if the ignition delay $\theta$d fluctuates due to, say, turbulence in the flow of the mixture, the engine will be provided with the optimum ignition timing for achieving maximum horsepower at the prevailing engine rpm.

As many apparently widely different embodiments of the present invention can be made without departing from the spirit and scope thereof, it is to be understood that the invention is not limited to the specific embodiments thereof except as defined in the appended claims.

What is claimed is:

1. An ignition timing control system for an internal combustion engine having a crankshaft, at least one cylinder, and a starter, said system comprising:

crank angle detecting means for producing a first pulse signal indicative of a reference crank angle position of the crankshaft and a second pulse signal indicative of a crank angle position that changes constantly with rotation of the crankshaft;

ideal crank angle detecting means receiving the first and second pulse signals from said crank angle detecting means for producing an output signal indicative of an ideal crank angle position at which pressure internal of the cylinder of the engine attains a peak value;

pressure sensing means for sensing the peak value of pressure internal of the cylinder which exceeds a predetermined value and for producing an output signal indicative of the sensed peak value of pressure;

phase difference detecting means receiving the output signals from said ideal crank angle detecting means and from said pressure sensing means for detecting a phase difference between said output signals and for producing an output signal indicative of the detected phase difference;

first ignition timing control means receiving the output signal from said phase difference detecting means for producing an output signal indicative of optimum ignition timing which is in accordance with the detected phase difference; and second ignition timing control means receiving the first and second pulse signals from said crank angle detecting means and an input signal from the starter of the engine for controlling ignition timing to a fixed value only for a period of time during which said input signal indicates actuation of the starter.

2. The ignition timing control system according to claim 1, wherein said pressure sensing means comprises:

a pressure sensor secured to a portion of a cylinder head of the engine for sensing a pressure variation internal of the cylinder and for producing an output signal indicative of the detected pressure variation, and a pressure peak detector which compares the output signal from said pressure sensor with a threshold potential of a prescribed level for detecting the peak value of pressure internal of the cylinder.

3. The ignition timing control system according to claim 2, wherein said pressure sensor comprises a piezoelectric element.

4. The ignition timing control system according to claim 1, further comprising ignition timing computing means receiving the first and second pulse signals from said crank angle detecting means for computing engine speed based on said first and second pulse signals as well as an ignition timing dependent upon the computed engine speed, and for sending an output signal indicative of the computed ignition timing to said first ignition timing control means.

5. The ignition timing control system according to claim 4, wherein said first ignition timing control means produces said output signal indicative of optimum ignition timing by correcting the output signal from said ignition timing computing means in accordance with the detected phase difference.

* * * * *